United States Patent
Nakata et al.

(10) Patent No.: US 10,037,042 B2
(45) Date of Patent: Jul. 31, 2018

(54) VALVE CONTROL SYSTEM AND VALVE CONTROL METHOD FOR STEAM TURBINE

(71) Applicant: KABUSHIKI KAISHA TOSHIBA, Minato-Ku (JP)

(72) Inventors: Norihito Nakata, Ota (JP); Toshio Aoki, Chigasaki (JP); Masaaki Matsumoto, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/768,544

(22) PCT Filed: Feb. 18, 2014

(86) PCT No.: PCT/JP2014/053798
§ 371 (c)(1),
(2) Date: Aug. 18, 2015

(87) PCT Pub. No.: WO2014/129467
PCT Pub. Date: Aug. 28, 2014

(65) Prior Publication Data
US 2015/0378369 A1 Dec. 31, 2015

(30) Foreign Application Priority Data
Feb. 19, 2013 (JP) ................................. 2013-029694

(51) Int. Cl.
*G05D 7/06* (2006.01)
*F01D 21/06* (2006.01)
(Continued)

(52) U.S. Cl.
CPC ........... *G05D 7/0641* (2013.01); *F01D 21/06* (2013.01); *F01K 7/165* (2013.01); *F01K 13/02* (2013.01); *F05D 2220/31* (2013.01)

(58) Field of Classification Search
CPC ..................................................... G05D 7/0641
(Continued)

(56) References Cited

U.S. PATENT DOCUMENTS 3,999,787 A    12/1976   Park
4,088,875 A *   5/1978   Podolsky ................ F01D 17/18
                                                                                      290/40 R
(Continued)

FOREIGN PATENT DOCUMENTS

CA            1041776 A     11/1978
EP            2175105 A1 *   4/2010              F01K 7/22
(Continued)

OTHER PUBLICATIONS

English translation of the International Preliminary Report on Patentability and Written Opinion dated Aug. 25, 2015 in PCT/JP2014/053798 filed Feb. 18, 2014.
(Continued)

*Primary Examiner* — Emilio J Saavedra
(74) *Attorney, Agent, or Firm* — Oblon, McClelland, Maier & Neustadt, L.L.P.

(57) ABSTRACT

A valve control system for a steam turbine that decrease in effective power as well as secure control stability in the event of an electric power system accident is provided.
A valve control system for a steam turbine includes an accident detection unit 44 which detects an occurrence of an electric power system accident, a first selection unit 45 which selects, from a plurality of control valves 13 (13a~13d) which adjust a volume of steam flowing into a steam turbine, control valves 13 to be rapidly closed according to a scale of the accident detected, and a normal control circuit 11 which continues normal pressure or speed control by the control valves 13 which are not selected.

5 Claims, 8 Drawing Sheets

(51) Int. Cl.
*F01K 13/02* (2006.01)
*F01K 7/16* (2006.01)

(58) Field of Classification Search
USPC .............................................. 700/289; 415/13
See application file for complete search history.

(56) References Cited

U.S. PATENT DOCUMENTS

| | | | | | |
|---|---|---|---|---|---|
| 4,095,119 | A | * | 6/1978 | Nangle | ................... F01D 21/02 |
| | | | | | 290/40 R |
| 4,120,159 | A | * | 10/1978 | Matsumoto | ............. F01D 19/02 |
| | | | | | 290/40 C |
| 4,357,803 | A | * | 11/1982 | Dickenson | .............. F01D 17/24 |
| | | | | | 60/662 |

FOREIGN PATENT DOCUMENTS

| | | | | |
|---|---|---|---|---|
| JP | 63 314302 | | | 12/1988 |
| JP | 64 15404 | | | 1/1989 |
| JP | 01015404 | A | * | 1/1989 |
| JP | 7 145704 | | | 6/1995 |
| JP | 07145704 | A | * | 6/1995 |
| JP | 10008912 | A | * | 1/1998 |
| JP | 2005 291113 | | | 10/2005 |
| JP | 2012 90422 | | | 5/2012 |

OTHER PUBLICATIONS

International Search Report dated Apr. 8, 2014 in PCT/JP14/053798 Filed Feb. 18, 2014.
Extended European Search Report dated Oct. 11, 2016 in Patent Application No. 14754322.7.

* cited by examiner

G : STEAM FLOW RATE BY RESET CONTROL VALVES AND RESET TURBINE BYPASS VALVES
G_Total : TOTAL STEAM FLOW RATE
Ncv : THE NUMBER OF CONTROL VALVES TO BE RAPIDLY CLOSED

VALVE CONTROL SYSTEM AND VALVE CONTROL METHOD FOR STEAM TURBINE

TECHNICAL FIELD

Embodiments of the present invention relate to a valve control technology for steam turbines.

BACKGROUND ART

In a thermal power plant or a nuclear power plant connected to an electric power system, when the plant is in a normal operation, a mechanical input from a turbine and an electrical output of a generator are kept in balance, so that the turbine rotation speed is maintained constant.

However, if an accident occurs in the electric power system, this balance is lost due to a rapid decrease in electrical output of the generator, and the turbine rotation speed increases. If this speed reaches a certain limit, a stable operation of the plant may become no longer possible.

Early Valve Actuation is known as a method for preventing such circumstances. This technique suppresses increase in the turbine rotation speed, in the event of electric power system accident, by fully rapid closure of control valves or intercept valves, which flow steam into the turbine, and thereby temporarily blocking the steam flow into the turbine.

There has been another method disclosed, which responds to an electric power system accident by reducing the valve opening position of control valves and intercept valves so as to adjust the flow rate of steam into a turbine (e.g., see Patent Document 1).

PRIOR ART DOCUMENTS

Patent Document

Patent Document 1: Japanese Patent Laid-Open No. H10-252416

SUMMARY OF THE INVENTION

Problems to be Solved by the Invention

Since Early Valve Actuation means rapid closure of all the control valves or intercept valves, steam flowing into the turbine is temporarily completely blocked. Accordingly, when the electric power system returns to a normal condition after an occurrence of an accident, there is a delay in recovering a mechanical torque output of a turbine by steam, which results in a significant decrease in effective power to be supplied to the electric power system.

The technology of Patent Document 1 involves adjusting control signals relating to the opening position of the control valves or the intercept valves, and reducing the valve opening position by servo actions subject to these control signals. Thus, there is a time delay before the actual opening position of the valves follow the control demand signal, which constitutes a lack of quick response to accidents.

In nuclear power plants, it is important to control the reactor pressure with stability and high accuracy. A stable control method is therefore required which can continuously maintain the reactor pressure constant by suppressing disturbances caused by valve actuation at the time of an occurrence of an accident and resetting after recovery.

The present invention has been devised in view of such situations, and an object of the present invention is to provide a valve control system and a valve control method for a steam turbine which suppress decrease in effective power as well as secure control stability in the event of electric power system accident.

Means for Solving the Problems

A valve control system for a steam turbine includes an accident detection unit which detects an occurrence of an electric power system accident, a first selection unit which selects, from a plurality of control valves which adjust a volume of steam flowing into a steam turbine, control valves to be rapidly closed according to a scale of the accident detected, and a normal control circuit which continues normal pressure or speed control by the control valves which are not selected.

Advantages of the Invention

According to the present invention, there is provided a valve control system and a valve control method for a steam turbine which suppresses decrease in effective power as well as secure control stability in the event of an emergency of electric power system accident.

DESCRIPTION OF EMBODIMENT

In the following, an embodiment of the present invention will be described on the basis of the accompanying drawings.

Figure 1:
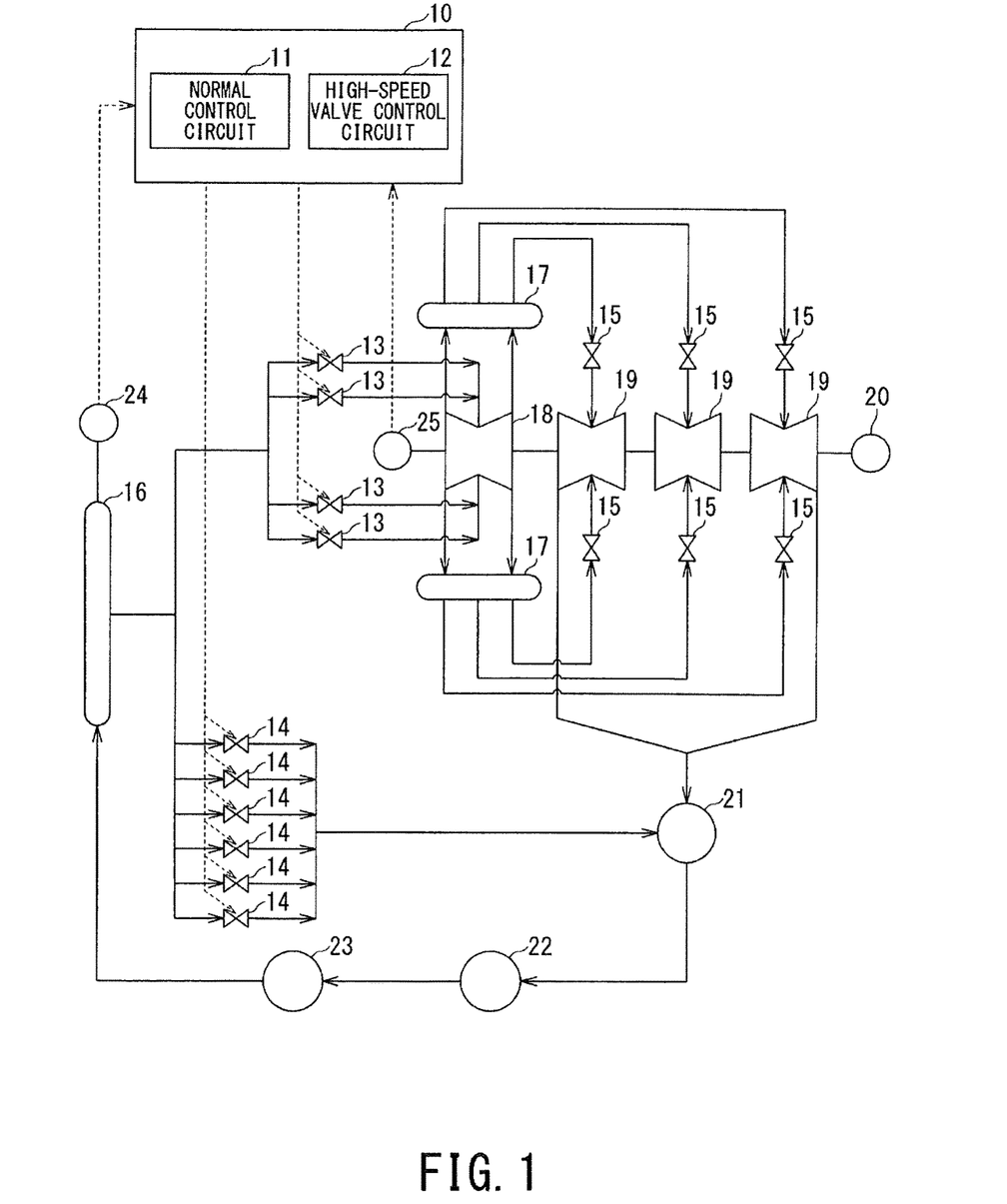
FIG. 1 is a configuration diagram of a boiling water nuclear power plant according to an embodiment.

FIG. 1 is a configuration diagram of a boiling water nuclear power plant according to the embodiment.

This boiling water nuclear power plant causes a nuclear fission reaction in a reactor pressure vessel 16, and generates main steam by thermal energy generated by the reaction.

A high-pressure turbine 18 receives an input of the generated main steam, converts thermal energy possessed by the steam into kinetic energy, and outputs high-pressure turbine exhaust. On an input side of the high-pressure turbine 18, control valves 13 are provided which control an inflow rate of the main steam to be input into the high-pressure turbine 18. While there are four control valves 13 in FIG. 1, the number of the control valves 13 is not limited to that shown in FIG. 1.

A moisture separator and reheater 17 removes moisture from steam contained in the high-pressure turbine exhaust discharged from the high-pressure turbine 18, and inputs this high-pressure turbine exhaust into a low-pressure turbine 19.

The low-pressure turbine 19 receives an input of the high-pressure turbine exhaust, converts its thermal energy into kinetic energy, and outputs low-pressure turbine exhaust. On an input side of the low-pressure turbine 19, intercept valves 15 are provided which control a steam inflow rate of the high-pressure turbine exhaust to be input from the moisture separator and reheater 17 into the low-pressure turbine 19. While there are six intercept valves 15 in FIG. 1, the number of the intercept valves 15 is not limited to that shown in FIG. 1.

A generator 20 is disposed coaxially with the high-pressure turbine 18 and the low-pressure turbine 19, and converts the kinetic energy derived from steam in the turbines into electrical energy.

The low-pressure turbine exhaust output from the low-pressure turbine 19 is turned into condensate in a condenser 21, and returned to the reactor pressure vessel 16 through a condensate pump 22 and a feed water pump 23.

When a volume of steam generated in the reactor pressure vessel 16 exceeds a volume of steam flowing into the turbine, an excess portion of the volume of steam is circulated to the condenser 21 and returned directly to the reactor pressure vessel 16.

On an output side of the reactor pressure vessel 16, turbine bypass valves 14 are provided which control an inflow rate of excess steam to be input from the reactor pressure vessel 16 into the condenser 21. While there are six turbine bypass valves 14 in FIG. 1, the number of the turbine bypass valves 14 is not limited to that shown in FIG. 1.

A valve control system 10 is composed of a normal control circuit 11 and a high-speed valve control circuit 12.

The normal control circuit 11 receives inputs of a pressure signal of the reactor detected by a pressure detector 24 and a turbine rotation speed signal detected by a turbine rotation speed detector 25. On the basis of these detection signals, the normal control circuit 11 adjusts opening position of the control valves 13 and the turbine bypass valves 14 to control a volume of steam flowing into each valve.

Thus, the normal control circuit 11 controls the reactor pressure or the turbine rotation speed during rated operation or start/stop operation.

On the other hand, the high-speed valve control circuit 12 controls opening/closing of the control valves 13 and the turbine bypass valves 14 in the event of electric power system accident.

Figure 2:
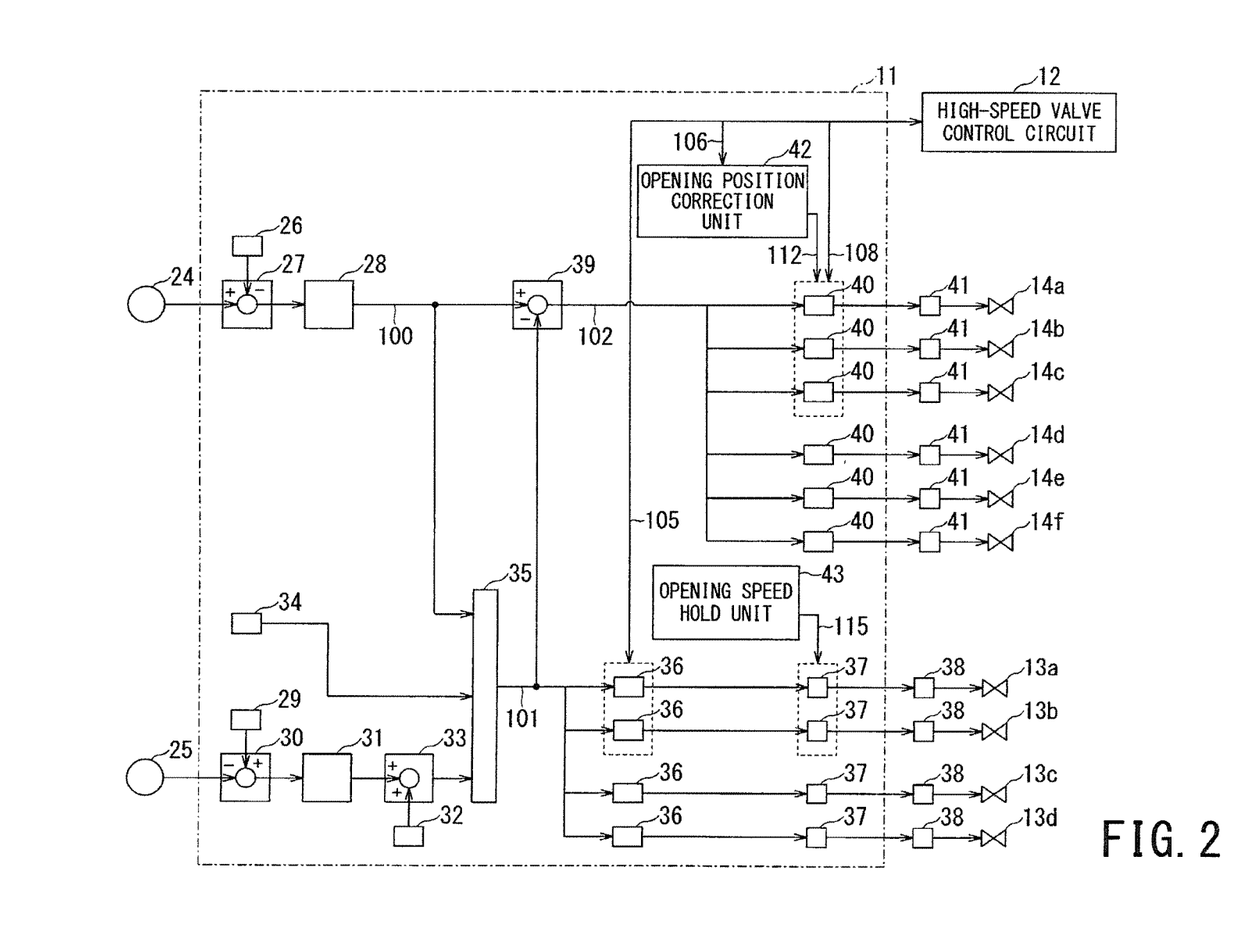
FIG. 2 is a configuration diagram of a normal control circuit applied to the embodiment.

FIG. 2 shows a specific configuration diagram of the normal control circuit 11. In FIG. 2, the same components as in FIG. 1 are given the same reference signs.

The pressure detector 24 detects a pressure inside the reactor pressure vessel 16 (FIG. 1) and outputs a detection signal to a deviation computing element 27.

Then, the deviation computing element 27 performs a subtraction between the input detection signal and a pressure set value which is preset in a pressure setter 26, and outputs a subtracted signal to a multiplier 28.

The multiplier 28 multiplies this subtracted signal by a gain to calculate a total steam flow rate 100.

This total steam flow rate 100 indicates a flow rate of steam to be discharged from the reactor pressure vessel 16, as required to maintain a constant pressure of the reactor pressure vessel 16.

The turbine rotation speed detector 25 detects a turbine rotation speed and outputs a detection signal to a deviation computing element 30.

Then, the deviation computing element 30 performs a subtraction between the input detection signal and a speed set value which is preset in a turbine rotation speed setter 29, and outputs a subtracted signal to a multiplier 31.

The multiplier 31 multiplies the subtracted signal by a gain to obtain a speed deviation signal.

Then, an adder 33 adds this speed deviation signal and a load set value which is set in a load setter 32 to calculate a speed and load control signal.

A maximum steam flow rate setter 34 is provided to limit a total flow rate of steam flowing from the reactor pressure vessel 16 to the control valves 13 and the turbine bypass valves 14.

A low value gate 35 selects a signal of the lowest value from the total steam flow rate 100, a steam flow demand signal when the turbine rotation speed is controlled to a speed represented by the speed and load control signal, and a steam flow demand signal represented by a setting signal of the maximum steam flow rate setter 34. Then, the low value gate 35 outputs the selected signal as a control valve flow rate demand signals 101 to the control valves 13 (13*a* to 13*d*).

The four control valves 13*a* to 13*d* are each provided with a flow rate/opening position converter 36 and an opening speed limiter 37, and each include a servo valve 38.

The flow rate/opening position converter 36 converts the control valve flow rate demand signals 101 which is output from the low value gate 35 into an opening position demand signals and outputs it to the opening speed limiter 37.

In the opening speed limiter 37, an upper limit value for opening speed of the control valves 13 is set. If the opening position of the four control valves 13*a* to 13*d* is adjusted simultaneously at high speed, an oil pressure supply by the servo valves 38 may fall short. Therefore, the opening speed limiter 37 adjusts opening speed of each control valve 13 to prevent decrease in oil pressure supply by the servo valve 38.

The servo valve 38 receives an input of the opening position demand signal through the opening speed limiter 37, and according to this control amount varies the volume of supply of control oil to thereby adjust the valve opening position of the control valves 13.

On the other hand, a deviation computing element 39 performs a subtraction between the total steam flow rate 100 and the control valve flow rate demand signal 101 to calculate a turbine bypass valve flow rate demand signal 102.

The six turbine bypass valves 14*a* to 14*f* are each provided with a flow rate/opening position converter 40, and each include a servo valve 41.

The flow rate/opening position converter 40 converts the turbine bypass valve flow rate demand signal 102 into an opening position demand signal.

The servo valve 41 receives an input of the opening position demand signal from the flow rate/opening position converter 40, and according to this control amount varies the volume of supply of control oil to thereby adjust the valve opening position of the turbine bypass valves 14.

The flow rate/opening position converter 40 adds setting parameters, which allow the six servo valves 41 to act sequentially, to the opening position demand signal.

Here, control actions during rated operation of the plant will be described.

During rated operation, the value of the load setter 32 is set to a value larger than the actual load so that the total steam flow rate 100 is selected by the low value gate 35. The reactor pressure is controlled through adjustment of the opening position of the control valves 13.

Meanwhile, the turbine bypass valves 14 are fully closed. However, when the turbine rotation speed increases and the speed and load control signal, which is output from the adder 33, is selected by the low value gate 35, the opening position of the control valves 13 are reduced, and the control shifts to turbine rotation speed control.

Meanwhile, excess steam resulting from the reduction of the opening position of the control valves 13 is circulated to the condenser 21 (FIG. 1) through the turbine bypass valves 14 in order to keep a constant pressure of the reactor. Therefore, the reactor pressure is controlled by the turbine bypass valves 14.

Thus, the normal control circuit 11 adjusts the opening position of the control valves 13 and the turbine bypass valves 14 to perform normal control of the reactor pressure or the turbine rotation speed. An opening position correction unit 42 and an opening speed hold unit 43 will be described later.

Figure 3:
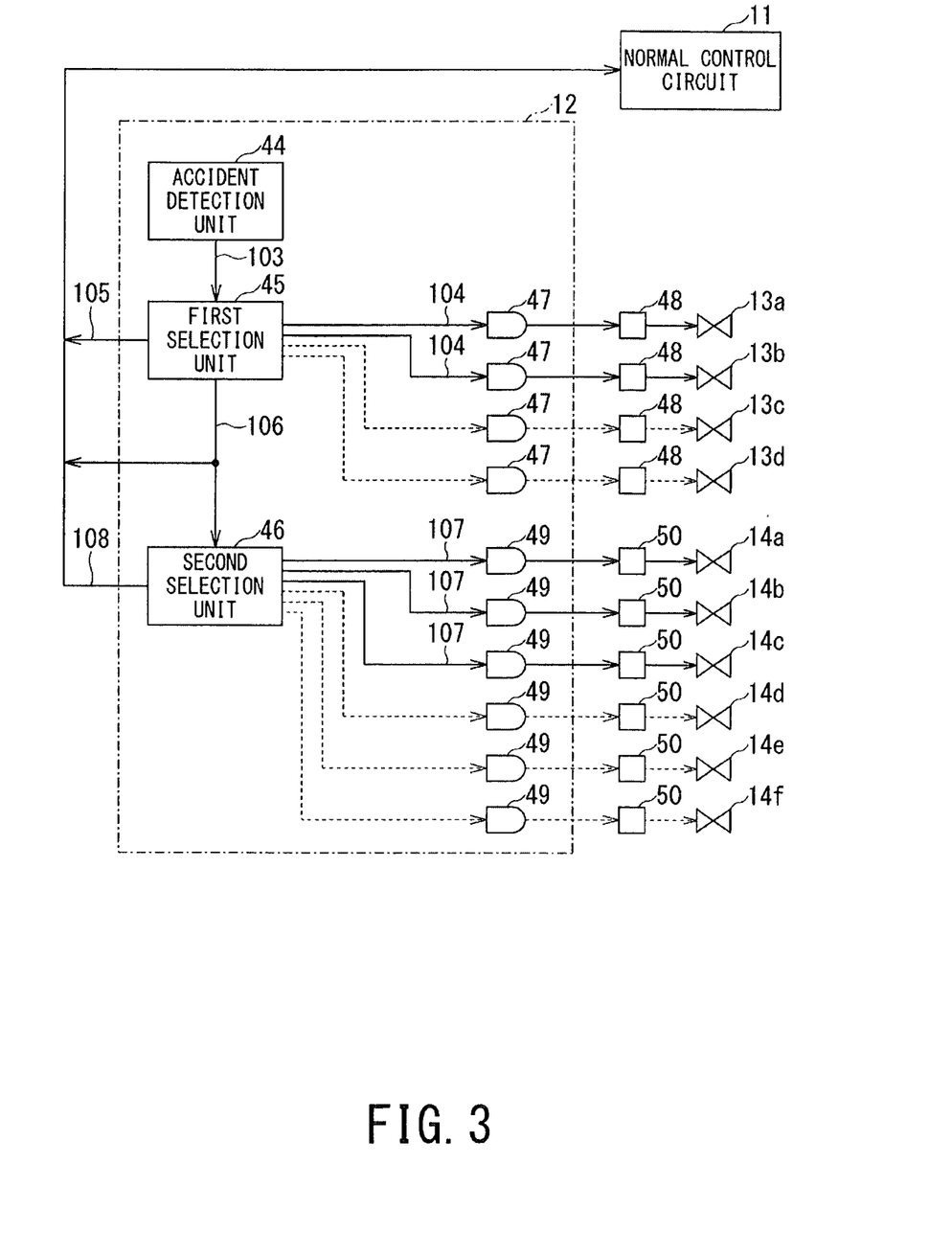
FIG. 3 is a configuration diagram of a high-speed valve control circuit applied to the embodiment.

FIG. 3 shows a configuration diagram of the high-speed valve control circuit 12. In FIG. 3, the same components as in FIG. 1 are given the same reference signs.

The high-speed valve control circuit 12 is composed of an accident detection unit 44, a first selection unit 45, and a second selection unit 46.

The accident detection unit 44 detects an occurrence of an electric power system accident, for example, from a decrease in total output voltage or a decrease in total output current of the generator, and outputs information about a scale, location, and significance of the accident, as an accident detection signal 103, to the first selection unit 45.

The first selection unit 45 receives an input of the accident detection signal 103, and selects control valves 13 to be rapidly closed according to the scale, location, and significance of the electric power system accident. In the first selection unit 45, a number of the control valves 13 to be rapidly closed according to the scale etc. of an electric power system accident is preset. Then, the first selection unit 45 outputs a rapid closing demand signal 104 to the selected control valves 13.

Thus, the first selection unit 45 can be configured so as to select a larger number of the control valves 13 from the plurality of control valves 13 for a larger scale and impact of an electric power system accident.

Here, a case where the control valves 13a, 13b are selected will be discussed.

The control valves 13a to 13d are each provided with an off-delay timer 47, and each include a solenoid valve for control valves 48.

The off-delay timer 47 is a timer which, when the rapid closing demand signal 104 is reset from its on-state, outputs a reset signal after the elapse of a certain period of time. Therefore, the off-delay timer 47 does not act when the rapid closing demand signal 104 is active.

The solenoid valve for control valves 48 is a solenoid valve which is excited upon receiving an input of the rapid closing demand signal 104 and closes the control valves 13 at high speed.

Therefore, the control valves 13a, 13b selected by the first selection unit 45 are rapidly closed as the solenoid valves for control valves 48 are excited upon receiving an input of the rapid closing demand signal 104.

Meanwhile, the control oil controlling the selected control valves 13a, 13b is drained at high speed, and these control valves 13a, 13b are cut off from the control by the servo valves 38 (FIG. 2).

The first selection unit 45 outputs a selected control valve opening position change demand signal 105 to the normal control circuit 11.

This selected control valve opening position change demand signal 105 is input into the flow rate/opening position converter 36 (FIG. 2) of the normal control circuit 11, and forcibly changes the opening position of the rapidly closed control valves 13a, 13b to 0% in accordance with the actual opening position.

On the other hand, the normal control circuit 11, at the time of an occurrence of an electric power system accident, performs normal control of the reactor pressure or the turbine rotation speed by the control valves 13c, 13d which are not rapidly closed by the first selection unit 45.

Therefore, in the event of an electric power system accident, it is possible to suppress overspeed of the turbine by rapidly closing only the control valves 13a, 13b which are selected by the first selection unit 45.

Moreover, it is possible to quickly respond to the electric power system accident by rapid closure of the control valves 13a, 13b by using the solenoid valves for control valves 48 which act at high speed.

Furthermore, it is possible to suppress decrease in effective power while maintaining synchronization with the generator 20 (FIG. 1) by performing normal control by the control valves 13c, 13d which are not selected.

The second selection unit 46 selects turbine bypass valves 14 to be rapidly opened on the basis of the number of the control valves 13 which have been rapidly closed.

Figure 4:
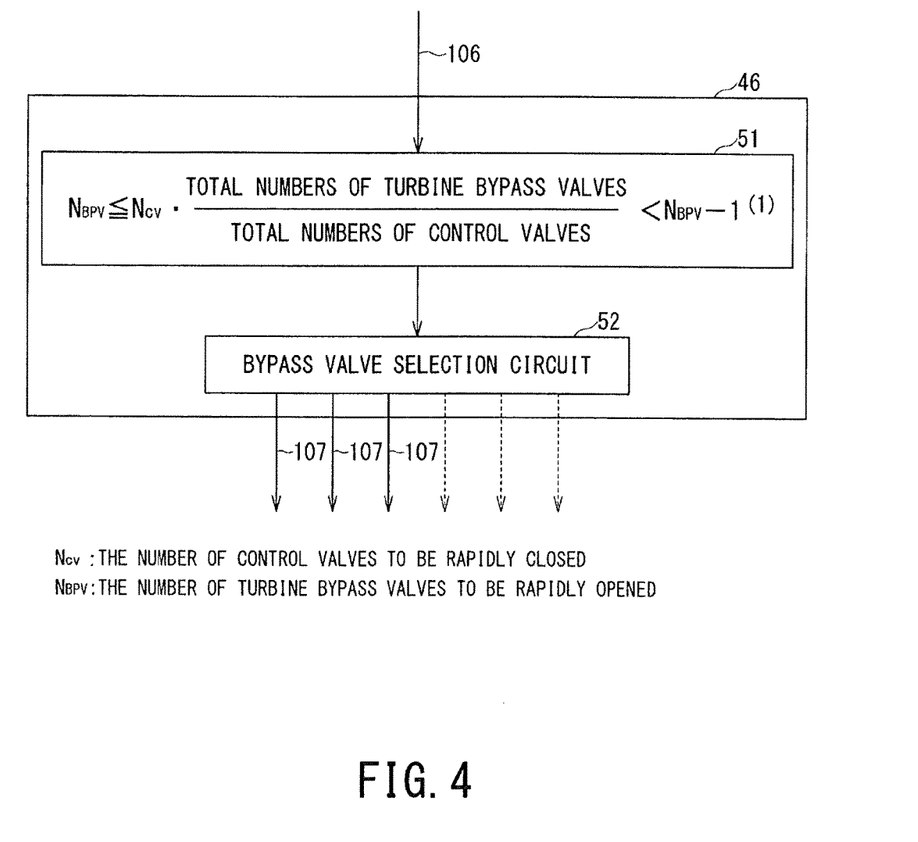
FIG. 4 is a configuration diagram of a configuration diagram of a second selection unit applied to the embodiment.

FIG. 4 shows a configuration diagram of the second selection unit 46.

The second selection unit 46 is composed of a calculation circuit 51 and a turbine bypass valve selection circuit 52.

The calculation circuit 51 receives an input of a number of control valves selected 106, which indicates the number of the control valves 13 having been rapidly closed, from the first selection unit 45. According to the control valves 13 rapidly closed, the calculation circuit 51 calculates a number of the turbine bypass valves 14, which makes an equal capacity, using an expression (1) shown in FIG. 4.

Depending on the numbers of the control valves 13 and the turbine bypass valves 14 installed, it is not always possible to make an equal capacity. In that case, the number of the turbine bypass valves 14 to be rapidly opened should be such that the capacity of the turbine bypass valves 14 becomes the largest without exceeding the capacity of the control valves 13 which are rapidly closed.

Thus, it is possible to minimize the increase in reactor pressure by rapidly opening the turbine bypass valves 14 such that the capacity of these turbine bypass valves 14 becomes equal to or almost equal to the capacity of the control valves 13 which are rapidly closed.

The turbine bypass valve selection circuit 52 receives an input of the number of the turbine bypass valves 14 to be rapidly opened, and selects turbine bypass valves 14 to be rapidly opened on the basis of this number. Then, the turbine bypass valve selection circuit 52 outputs a rapid opening demand signal 107 to the selected turbine bypass valves 14.

Here, a case where three turbine bypass valves 14a to 14c of the six turbine bypass valves are selected will be discussed.

Returning to FIG. 3, the description will continue. The six turbine bypass valves 14a to 14f are each provided with an off-delay timer 49, and each include a solenoid valve for turbine bypass valves 50.

The off-delay timer 49 is a timer which, when the rapid opening demand signal 107 is reset from its on-state, outputs a reset signal after the elapse of a certain period of time. Therefore, the off-delay timer 49 does not act when the rapid opening demand signal 107 is active.

The solenoid valve for turbine bypass valves 50 is a solenoid valve which is excited upon receiving an input of the rapid opening demand signal 107 and opens the turbine bypass valve 14 at high speed.

Therefore, the turbine bypass valves 14a to 14c rapidly opened by the second selection unit 46 are rapidly opened as the solenoid valve for turbine bypass valves 50 are excited upon receiving an input of the rapid opening demand signal 107.

Meanwhile, the control oil controlling the turbine bypass valves 14a to 14c, which have been rapidly opened, is drained at high speed and these turbine bypass valves 14a to 14c are cut off from the control by the servo valves 41 (FIG. 2).

The second selection unit 46 outputs a selected turbine bypass valve opening position change demand signal 108 to the normal control circuit 11.

This selected turbine bypass valve opening position change demand signal 108 is input into the flow rate/opening position converter 40 (FIG. 2) of the normal control circuit 11, and forcibly changes the opening position of the selected turbine bypass valves 14a to 14c to 100% in accordance with the actual opening position.

On the other hand, the normal control circuit 11, at the time of an occurrence of an electrical power system accident, performs normal control of the reactor pressure by the turbine bypass valves 14d to 14f which are not rapidly opened by the second selection unit 46.

In a case where the capacity of the control valves 13 which are rapidly closed and the capacity of the turbine bypass valves 14 which are rapidly opened are not equal, a smaller volume of steam is circulated from the rapidly opening turbine bypass valves 14 into the condenser 21 (FIG. 1). In this case, the reactor pressure is controlled by the turbine bypass valves 14d to 14f which are not rapidly opened by the second selection unit 46.

Therefore, it is possible to stably control the reactor pressure, even at the time of an occurrence of an electric power system accident, by the normal control circuit 11 performing normal pressure control by the turbine bypass valves 14d to 14f which are not selected by the second selection unit 46.

Next, a case will be described where the electric power system has recovered from the accident and the plant is brought back under normal control by all of the control valves 13 and the turbine bypass valves 14.

When the electric power system has recovered from the accident, the rapid closing demand signal 104, which has been output from the first selection unit 45, is reset.

As the rapid closing demand signal 104 is reset, the off-delay timers 47, which correspond to the control valves 13a, 13b having been rapidly closed, sequentially output a reset signal to the solenoid valves for control valves 48 after the elapse of a certain period of time.

Then, as the rapid closing demand signal 104 is reset, the solenoid valves for control valves 48, which have been excited, lose excitation and open. Meanwhile, the control valves 13a, 13b are sequentially brought back under the control of the servo valves 38 (FIG. 2).

Since the control valves 13a, 13b are sequentially shifted to actions based on the servo valves by the actions of the off-delay timers 47, decrease in oil pressure of the servo valves 38 can be prevented.

The selected control valve opening position change demand signal 105 is also reset. As a result, the opening position demand signal, which has been forcibly changed to 0%, is returned to the opening position demand signal which is obtained by converting the control valve flow rate demand signal 101 by the flow rate/opening position converter 36 (FIG. 2).

Then, the control valves 13a, 13b, which have been rapidly closed, start opening from the closed state in accordance with the opening position demand signal. The control valves 13 open at an upper limit speed which is determined by the opening speed limiter 37.

On the other hand, the rapid opening demand signal 107, which has been output from the second selection unit 46, is also reset at the same time as the resetting of the rapid closing demand signal 104.

As the rapid opening demand signal 107 is reset, the off-delay timers 49, which correspond to the turbine bypass valves 14a to 14c having been rapidly opened, sequentially output a reset signal to the solenoid valves for turbine bypass valves 50 after the elapse of a certain period of time.

The off-delay timers 49 are set so as to start outputting the reset signal to the solenoid valves for turbine bypass valves 50 in synchronization with a first reception of the reset signal for the rapid closing demand signal 104 by the solenoid valve for control valves 48.

Then, as the rapid opening demand signal 107 is reset, the solenoid valves for turbine bypass valves 50, which have been excited, lose excitation and close. Meanwhile, the turbine bypass valves 14a to 14c are sequentially brought back under the control of the servo valves 41 (FIG. 2).

The selected turbine bypass valve opening position change demand signal 108 is also reset. As a result, the opening position demand signal, which has been forcibly changed to the opening position of 100%, is returned to the opening demand signal obtained by converting the turbine bypass valve flow rate demand signal 102 by the flow rate/opening position converter 40 (FIG. 2).

Then, the turbine bypass valves 14a to 14c, which have been rapidly opened, start closing from the open state in accordance with the opening position demand signal by the normal control circuit 11.

If the turbine bypass valves 14 start closing independently of the control valves 13 which start opening, the balance of the volume of steam flowing into the turbine is lost, which may disturb the control valves 13c, 13d and the turbine bypass valves 14d to 14f which are continuing the normal control.

If the turbine bypass valves 14a to 14c having been rapidly opened are closed from the open state, through the actions of the off-delay timers 49, in synchronization with the control valves 13a, 13b, which have been rapidly closed, opening from the closed state, the balance of the volume of steam flowing into the turbine is kept. Thus, disturbance to the normal control can be prevented.

Subsequently, the opening position correction unit 42 (FIG. 2) will be described.

When all the control valves 13 and the turbine bypass valves 14 are to be brought back under the normal control, the opening position correction unit 42 corrects the valve opening position of the turbine bypass valves 14a to 14c, which shift from the open state to the closed state, according to the valve opening position of the control valves 13a, 13b, which shift from the closed state to the open state.

Figure 5A:
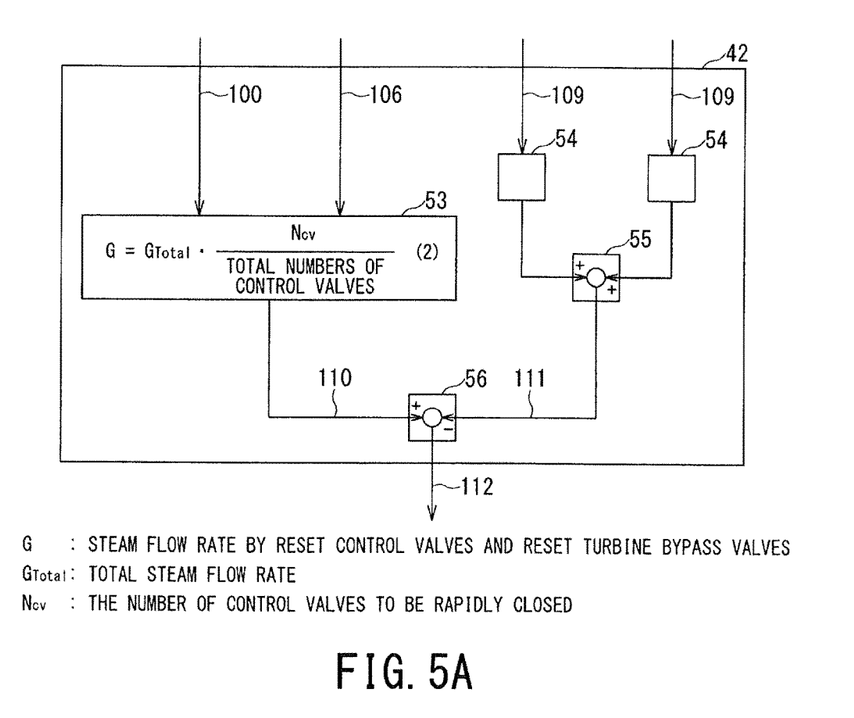
FIG. 5(A) is a configuration diagram of an opening position correction unit applied to the embodiment.

FIG. 5(A) shows a specific configuration diagram of the opening position correction unit 42.

The opening position correction unit 42 is composed of a steam flow rate calculation circuit 53, an opening position/flow rate converter 54, an adder 55, and a deviation computing element 56.

The steam flow rate calculation circuit 53 receives inputs of the total steam flow rate 100 (FIG. 2) and the number of control valves selected 106 (FIG. 3).

Then, using an expression (2) shown in FIG. 5(A), the steam flow rate calculation circuit 53 calculates a flow rate of steam to be circulated by the control valves 13a, 13b which are opening from the closed state and the turbine bypass valves 14a to 14c which are closing from the open state. The steam flow rate calculation circuit 53 outputs this calculated steam flow rate as a resetting steam flow rate signal 110 to the deviation computing element 56.

The opening position/flow rate converter 54 receives an input of a rapidly closed control valve opening position signal 109 relating to the actual opening position of the control valves 13a, 13b which are opening from the closed state, and converts this signal into a steam flow rate.

The adder 55 adds these steam flow rates to calculate the flow rate of steam actually flowing through the control valves 13a, 13b. The adder 55 outputs this steam flow rate as a rapidly closed control valve flow rate signal 111 to the deviation computing element 56.

The deviation computing element 56 performs a subtraction between the resetting steam flow rate signal 110 and the rapidly closed control valve flow rate signal 111 to obtain a turbine bypass valve flow rate demand signal 112.

Then, the deviation computing element 56 inputs the turbine bypass valve flow rate demand signal 112 into the flow rate/opening position converters 40 (FIG. 2) of the turbine bypass valves 14a to 14c which are closing from the open state, and this demand signal is converted into an opening position demand signal to correct the valve opening position of the turbine bypass valves 14a to 14c.

Figure 5B:
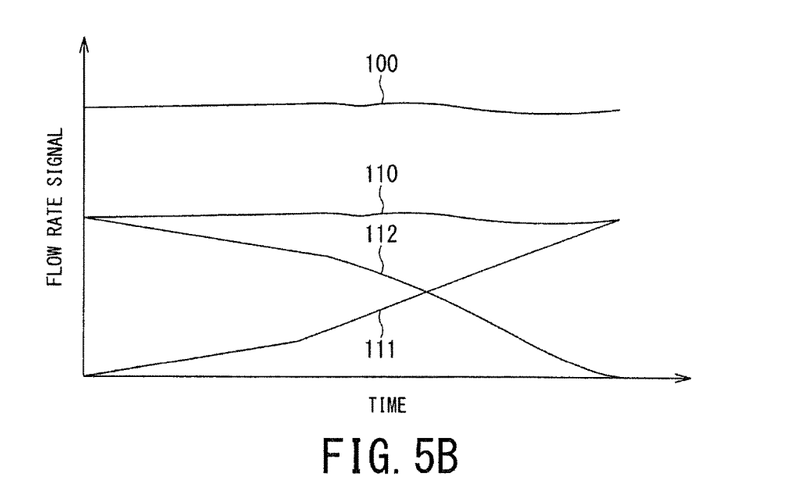
FIG. 5(B) is a graph showing, in time series, steam flow rate signals relating to the opening position correction unit applied to the embodiment.

FIG. 5(B) is a graph showing, in time series, the steam flow rate signals relating to the opening position correction unit 42.

As shown by the rapidly closed control valve flow rate signal 111, the volume of steam flowing into the control valves 13a, 13b, which have been rapidly closed, is gradually increased as these valves are opening from the closed state.

To secure the resetting steam flow rate signal 110 which is calculated from the total steam flow rate 100, the turbine bypass valve flow rate demand signal 112 decreases gradually as the rapidly closed control valve flow rate signal 111 increases.

Thus, the opening position correction unit 42 corrects the valve opening position of the turbine bypass valves 14a to 14c so as to match the volume of steam flowing gradually from the control valves 13a, 13b into the turbine.

Upon recovery of the electric power system from the accident, if the turbine bypass valves 14a to 14c close independently of the control valves 13a, 13b which are opening from the closed state, the balance between the volume of steam generated in the reactor and the volume of steam flowing into the turbine may be lost.

This causes a large disturbance to the control valves 13c, 13d and the turbine bypass valves 14d to 14f which are continuing the normal control.

Therefore, the opening position correction unit 42 keeps the balance of the steam flow rate by the control valves 13a, 13b which are opening and the turbine bypass valves 14a to 14c which are closing, making it possible to return to the normal control while minimizing the disturbance to the reactor pressure.

Figure 6:
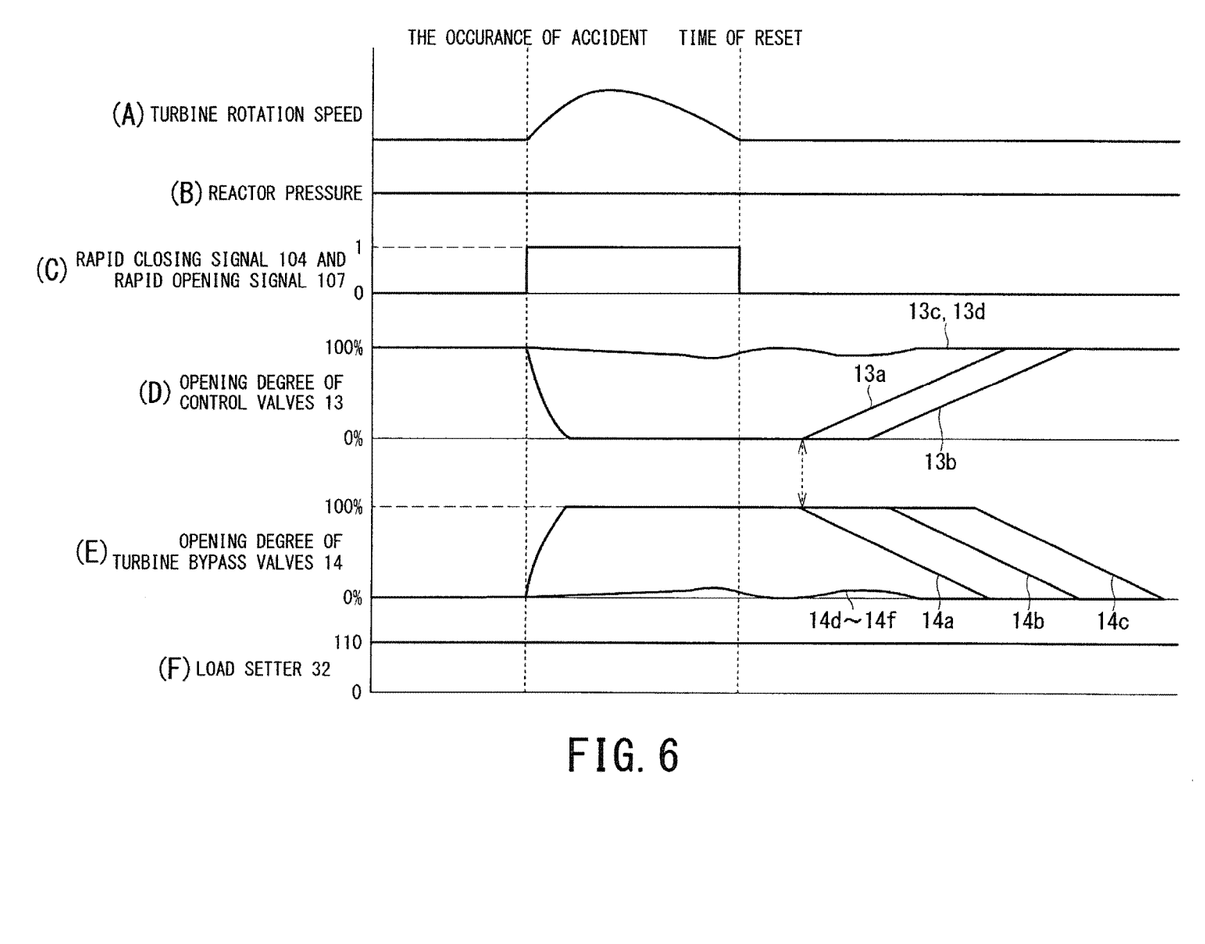
FIG. 6 is a timing chart showing opening position and actions of control valves and turbine bypass valves etc. according to the embodiment.

FIG. 6 shows a timing chart of the opening position change of the control valves 13 and the turbine bypass valves 14 etc. at the time of an electric power system accident.

The rapid closing demand signal 104 and the rapid opening demand signal 107 become valid (are turned on) in the event of an electric power system accident, and are reset (turned off) when the electric power system has recovered from the accident (FIG. 6(C)).

In the event of an electric power system accident, the control valves 13a, 13b are rapidly closed. Meanwhile, the control valves 13c, 13d, which are not rapidly closed, continue the normal pressure or speed control. Then, when the electric power system has recovered from the accident and been reset, the control valves 13a, 13b, which have been rapidly closed, sequentially start opening from the closed state (FIG. 6(D)).

On the other hand, in the event of an electric power system accident, the turbine bypass valves 14a to 14c are rapidly opened. Meanwhile, the turbine bypass valves 14c to 14f, which are not rapidly opened, continue the normal pressure control. Then, when the electric power system has recovered from the accident and been reset, the turbine bypass valves 14a to 14c sequentially start closing from the open state in synchronization with the control valve 13a which starts opening first (FIG. 6(E)).

Through the actions of the opening position correction unit 42, the turbine bypass valves 14a to 14c are further closing while keeping the balance of the flow rate of steam flowing into the control valve 13a, 13b which are opening (FIG. 6(E)).

It is therefore possible to stably control the turbine rotation speed (FIG. 6(A)) as well as to stably maintain the reactor pressure (FIG. 6(B)) in the event of an electric power system accident. Since the normal control is performed at the time of an occurrence of an electric power system accident, a constant load can be maintained (FIG. 6(F)).

Subsequently, the opening speed hold unit 43 (FIG. 2) will be described.

The opening speed hold unit 43 holds the valve opening position of the control valve 13a, 13b, which shift from the closed state to the open state, according to the valve opening position of the control valves 13c, 13d which are under normal control.

Figure 7:
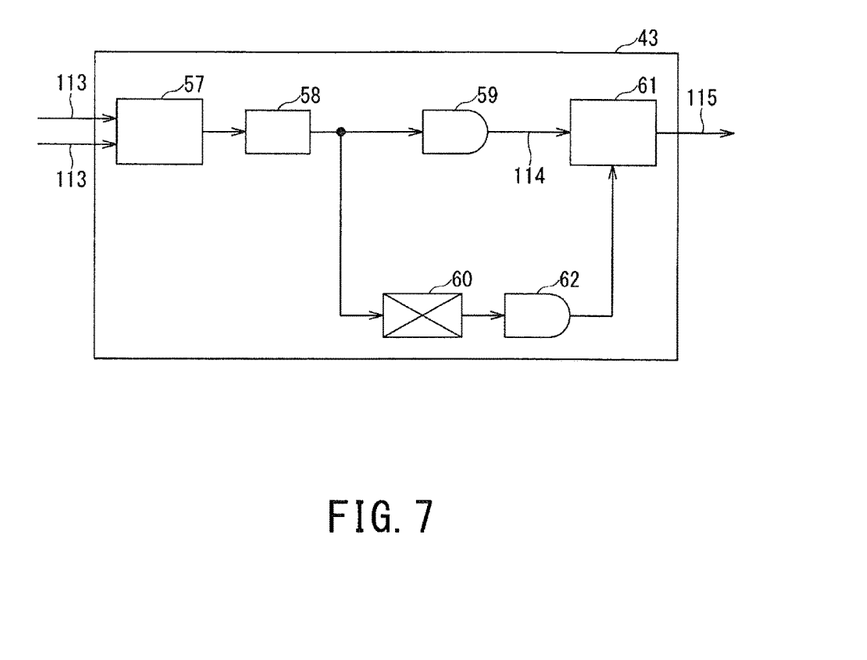
FIG. 7 is a configuration diagram of an opening speed hold unit applied to the embodiment.

FIG. 7 shows a specific configuration diagram of the opening speed hold unit 43.

The opening speed hold unit 43 is composed of a rate-of-change converter 57, a comparator 58, on-delay timers 59, 62, a NOT circuit 60, and a hold circuit 61.

In the event of an electric power system accident, the rate-of-change converter 57 inputs the actual opening position of the control valves 13c, 13d, which are under normal control without being rapidly closed, as normal control valve opening position signals 113. Then, the rate-of-change converter 57 calculates a rate of change from these opening position signals and outputs it to the comparator 58.

If the rate of change in opening position of the control valves 13c, 13d is lower than a predetermined value, the comparator 58 determines that the control valves 13c, 13d are acting in a closing direction, and outputs a validity signal to the on-delay timer 59.

When the validity signal has been input and lasted for a certain period of time or longer, the on-delay timer 59 outputs a closing action signal 114 to the hold circuit 61.

Upon receiving an input of the closing action signal 114, the hold circuit 61 outputs an opening position hold signal 115 to the opening speed limiters 37 (FIG. 2) corresponding to the control valve 13a, 13b which are shifting from the closed state to the open state.

The opening speed limiters 37, into which the opening position hold signal 115 has been input, change an upper limit value of opening speed to zero. As a result, the opening position of the control valve 13a, 13b, which are shifting from the closed state to the open state, are held.

When the valve opening position of the control valves 13c, 13d stop changing in the closing direction, the validity signal by the comparator 58 is turned off. This causes a validity signal to be output from the NOT circuit 60 to the on-delay timer 62.

When the validity signal from the NOT circuit 60 has been input and lasted for a certain period of time or longer, the on-delay timer 62 outputs a reset signal for the closing action signal 114 to the hold circuit 61.

Upon receiving an input of the reset signal, the hold circuit 61 outputs a reset signal for the opening position hold signal 115 to the opening speed limiters 37. As a result, the set upper limit value of opening speed is reset, and the control valve 13a, 13b resume the opening action.

Figure 8:
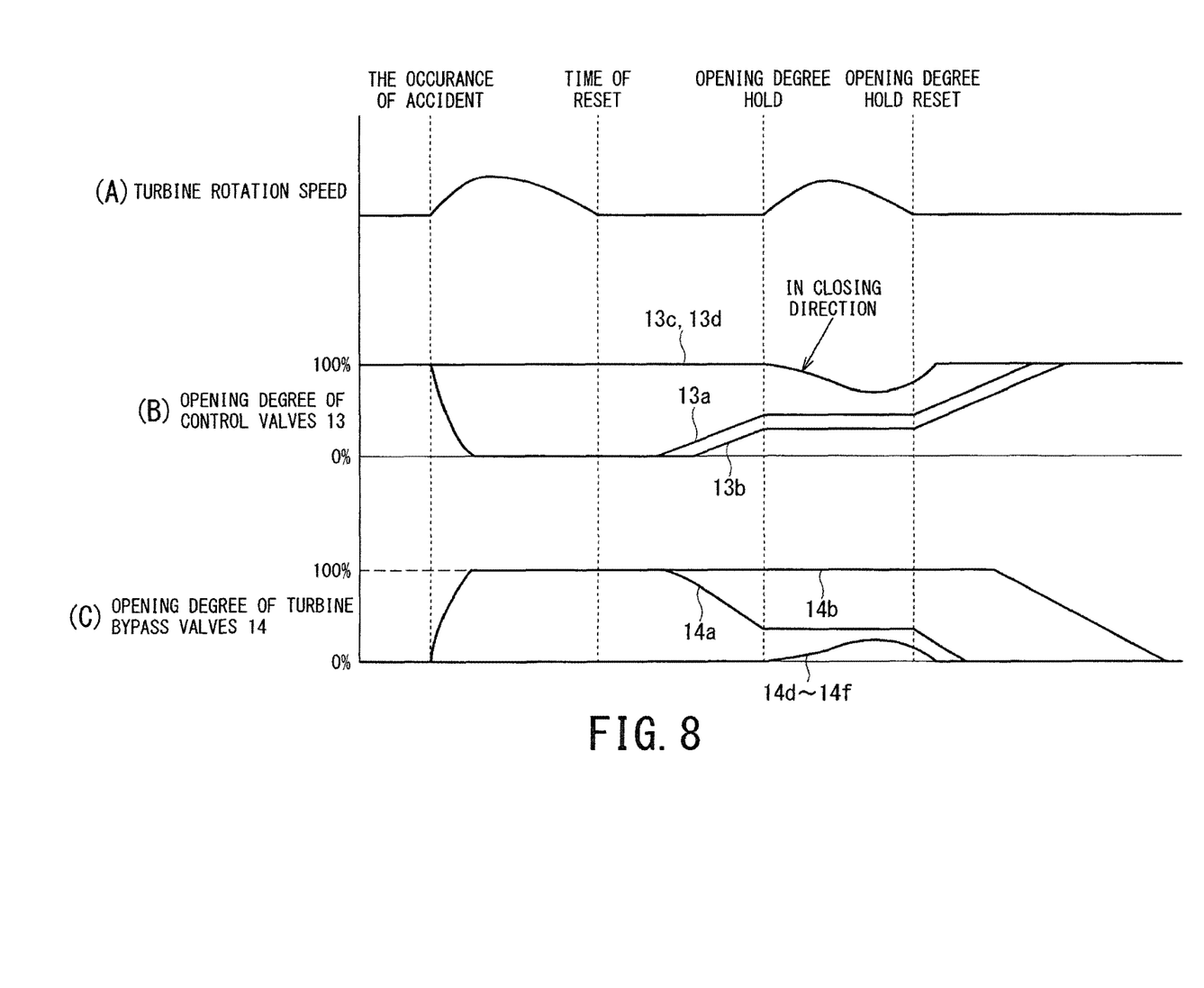
FIG. 8 is a timing chart showing opening position and actions of the control valves and the turbine bypass valves etc. relating to the opening speed hold unit applied to the embodiment.

FIG. 8 shows a timing chart of the opening position change of the control valves 13 and the turbine bypass valves 14 etc. relating to the opening speed hold unit 43.

A case will be discussed where the turbine rotation speed increases (FIG. 8(A)) after the electric power system has recovered from the accident and been reset.

When the turbine rotation speed increases, the control valves 13c, 13d, which are continuing the normal control, act in the closing direction so as to prevent overspeed of the turbine.

Meanwhile, the opening position of the control valve 13a, 13b, which are opening from the closed state, are held through the actions of the opening speed hold unit 43. Then, when the control valves 13c, 13d stop acting in the closing direction, the control valve 13a, 13b resume the opening action (FIG. 8(B)).

On the other hand, when the opening position of the control valve 13a, 13b are held, the opening position of the turbine bypass valves 14a, 14b, 14c (not shown), which are closing from the open state, are held through the actions of the opening position correction unit 42. Then, these turbine bypass valves resume the closing action following the opening action of the control valve 13a, 13b. The turbine bypass valves 14d to 14f continue the normal control (FIG. 8(C)).

If the control valve 13a, 13b, which have been rapidly closed, open independently while the control valves 13c, 13d under normal control are closing, the balance of the flow rate of steam flowing into the turbine is lost, which may disturb the control valves 13c, 13d under normal control.

It is possible to suppress the disturbance to the control valves 13c, 13d under normal control by holding the opening position of the control valve 13a, 13b, which are opening, by the opening speed hold unit 43.

According to the valve control system 10 for a steam turbine having been described, it has the first selection unit 45 for selecting control valves 13 to be rapidly closed and the second selection unit 46 for selecting turbine bypass valves 14 to be rapidly opened on the basis of the number of the control valves 13 to be rapidly closed. Thus, in the event of an electric power system accident, the valve control system 10 can suppress decrease in effective power as well as stably control the reactor pressure.

While one embodiment of the present invention has been described, this embodiment has been presented as an example and is not intended to limit the scope of the invention. This novel embodiment can be implemented in various other forms, and various omissions, substitutions, and changes can be made within the scope of the invention. This embodiment and its modifications are included in the scope and gist of the present invention, as well as in the invention described in the scope of claims and an equivalent scope. For example, while the configuration in the boiling water nuclear power plant has been shown in the embodiment, this configuration is also applicable to a thermal power plant and a pressurized water reactor (PWR) power plant.

The invention claimed is:

1. A valve control system for a steam turbine comprising:
circuitry configured to
detect an occurrence of an electric power system accident;
select, from a plurality of control valves which adjust a volume of steam flowing into a steam turbine, individual ones of the plurality of control valves to be rapidly closed at a same closing time such that a number of the control valves to be rapidly closed corresponds to a scale of the accident detected;
select, from turbine bypass valves which allow an excess portion of the volume of steam to bypass the turbine, individual ones of the plurality of turbine bypass valves to be rapidly opened at a same opening time such that a capacity of the turbine bypass values to be rapidly opened corresponds to a capacity of the control valves which are rapidly closed; and
closing the selected control valves to by rapidly closed and opening the selected turbine bypass valves to be rapidly opened,
while continuing normal pressure or speed control by the control valves and the turbine bypass valves which are not selected, to maintain stability of the steam turbine.

2. The valve control system for a steam turbine according to claim 1, wherein, when the electric power system has recovered from the accident and all the control valves and the turbine bypass valves are to be brought back under normal control, the turbine bypass valves are shifted from an open state to a closed state in synchronization with the control valves shifting from a closed state to an open state.

3. The valve control system for a steam turbine according to claim 1, wherein the circuitry is further configured to, when the electric power system has recovered from the accident and all the control valves and the turbine bypass valves are to be brought back under normal control, correct valve opening position of the turbine bypass valves which are shifting from an open state to a closed state, according to valve opening position of the control valves which are shifting from a closed state to an open state.

4. The valve control system for a steam turbine according to claim 1, wherein the circuitry is further configured to, when the electric power system has recovered from the accident and all the control valves and the turbine bypass valves are to be brought back under normal control, hold valve opening position of the control valves which are shifting from a closed state to an open state, according to valve opening position of the control valves which are not selected.

5. A valve control method for a steam turbine comprising the steps of:
- detecting an occurrence of an electric power system accident;
- selecting, from control valves which adjust a volume of steam flowing into a steam turbine, individual ones of the plurality of control valves to be rapidly closed at a same closing time such that a number of the control valves to be rapidly closed corresponds a scale of the accident detected;
- selecting, from turbine bypass valves which allow an excess portion of the volume of steam to bypass the turbine, individual ones of the plurality of turbine bypass valves to be rapidly opened at a same opening time such that a capacity of the turbine bypass values to be rapidly opened corresponds to a capacity of the control valves which are rapidly closed; and
- closing the selected control valves to be rapidly closed and opening the selected turbine bypass valves to be rapidly opened,
- while continuing normal pressure or speed control by the control valves and the turbine bypass valves which are not selected, to maintain stability of the steam turbine.

* * * * *